United States Patent
Zhao et al.

(10) Patent No.: US 10,117,103 B2
(45) Date of Patent: Oct. 30, 2018

(54) METHOD FOR SHARING NETWORK AND NETWORK ELEMENT

(71) Applicant: Huawei Technologies Co., Ltd., Shenzhen (CN)

(72) Inventors: Dong Zhao, Shenzhen (CN); Lan Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 80 days.

(21) Appl. No.: 15/264,274

(22) Filed: Sep. 13, 2016

(65) Prior Publication Data
US 2017/0006474 A1  Jan. 5, 2017

Related U.S. Application Data (63) Continuation of application No. PCT/CN2014/073466, filed on Mar. 14, 2014.

(51) Int. Cl.
*H04W 16/06* (2009.01)
*H04M 15/00* (2006.01)
*H04W 16/14* (2009.01)

(52) U.S. Cl.
CPC ............ *H04W 16/06* (2013.01); *H04M 15/60* (2013.01); *H04W 16/14* (2013.01)

(58) Field of Classification Search
CPC ....... H04W 16/06; H04W 16/14; H04W 4/24; H04W 24/10; H04W 48/08; H04W 84/042; H04W 88/06; H04M 15/00; H04M 15/60; H04M 15/07; H04M 15/44; H04M 15/66; H04L 12/14; H04L 12/56; H04L 12/5692
See application file for complete search history.

(56) References Cited

U.S. PATENT DOCUMENTS

| 9,432,909 B2 * | 8/2016 | Svedevall ............ H04W 48/02 |
| 2009/0055325 A1 | 2/2009 | Leventhal et al. |
| 2010/0014511 A1 | 1/2010 | Ezerzer et al. |
| 2010/0135241 A1 | 6/2010 | Wang |
| 2010/0195602 A1 | 8/2010 | Kovvali et al. |

(Continued)

FOREIGN PATENT DOCUMENTS

| CN | 101459597 A | 6/2009 |
| CN | 101965015 A | 2/2011 |

(Continued)

*Primary Examiner* — Tri H Phan
(74) *Attorney, Agent, or Firm* — Leydig, Voit & Mayer, Ltd.

(57) ABSTRACT

The present invention relates to a network sharing method and apparatus. The method comprises: a network element obtaining configuration information of resource sharing, the configuration information comprising: configuring a sharing type of a shared resource of the network element, configuring division of a share of the shared resource of the network element, and configuring a sharing party corresponding to the share of the shared resource of the network element; and the network element controlling the shared resource of the network element according to the configuration information. By means of the present invention, a share of a shared resource of a network element can be configured, and a carrier or a PLMN or a user equipment in a shared network can be accurately controlled.

17 Claims, 3 Drawing Sheets

(56) References Cited

U.S. PATENT DOCUMENTS

| | | | | |
|---|---|---|---|---|
| 2013/0046665 A1* | 2/2013 | Zabawskyj | ............ | H04L 12/14 705/34 |
| 2013/0303114 A1* | 11/2013 | Ahmad | ................ | H04W 16/14 455/406 |
| 2014/0073335 A1* | 3/2014 | Panchal | ................. | H04W 4/00 455/450 |
| 2014/0148165 A1* | 5/2014 | Serravalle | ............ | H04W 16/14 455/436 |
| 2014/0323140 A1* | 10/2014 | Yan | ...................... | H04W 16/10 455/450 |
| 2015/0264663 A1* | 9/2015 | Chen | .................... | H04W 48/06 455/450 |
| 2015/0351118 A1* | 12/2015 | Arnott | .................. | H04W 16/14 370/252 |
| 2016/0044702 A1* | 2/2016 | Centonza | ............. | H04W 24/08 370/328 |
| 2016/0249228 A1* | 8/2016 | Zhao | .................... | H04W 4/24 |
| 2017/0064534 A1* | 3/2017 | Loehr | .................. | H04W 72/04 |
| 2017/0289997 A1* | 10/2017 | Touag | .................. | H04W 16/14 |

FOREIGN PATENT DOCUMENTS

| | | | |
|---|---|---|---|
| CN | 102054126 A | | 5/2011 |
| CN | 102111577 A | | 6/2011 |
| CN | 102340831 A | | 2/2012 |
| CN | 102387507 A | | 3/2012 |
| EP | 2083591 A1 | | 7/2009 |
| EP | 2180737 A1 | | 4/2010 |
| EP | 2515568 A1 | | 10/2012 |
| GB | 2490968 A | | 11/2012 |
| WO | WO 2011075919 A1 | | 6/2011 |
| WO | WO 2013034168 A1 | | 3/2013 |
| WO | WO 2013093462 A1 | | 6/2013 |

* cited by examiner

METHOD FOR SHARING NETWORK AND NETWORK ELEMENT

CROSS-REFERENCE TO RELATED APPLICATIONS

This application is a continuation of International Application No. PCT/CN2014/073466, filed on Mar. 14, 2014, the disclosure of which is hereby incorporated by reference in its entirety.

FIELD

The disclosure relates to the technical field of wireless communications, and in particular to a method for sharing a network and a network element.

BACKGROUND

With the increasingly developed technology of communication networks, multiple operators or multiple public land mobile networks (PLMN) may provide various services, which facilitate work and life for a user of a user equipment. However, with increased operators or services, lots of networks are shared for cost saving. In a scenario with a sharing network across PLMNs or a user equipment across PLMNs, multiple operators provide various services for different users or a same user. Network resources for the sharing network or load capacity of a network element are both limited. Therefore, in the network shared by multiple operators or in multiple PLMNs, issues such as share control on the operators or the PLMNs, and control management for access or migration of the user equipment, are inevitable.

In conventional technology, shares of resources of the sharing network element are divided, the respective operators correspond to respective shares, and whether the user equipment (UE) can access the sharing network element depends on whether a home operator of the user equipment exhausts the share of the resources corresponding to the operator in the sharing network element. With the conventional network management method, accurate control on the operator, the PLMN or the user equipment cannot be implemented.

SUMMARY

A method for sharing a network and a network element are provided according to the disclosure, to configure shares of sharing resources of the network element, which may implement accurate control on operators, PLMNs, or user equipments.

In one aspect, a network element is provided according to the disclosure. The network element includes: an acquiring unit and a processing unit.

The acquiring unit is configured to acquire configuration information for resource sharing, wherein the configuration information includes one or any combination of the following:

sharing types of sharing resources of the network element;

division for shares of the sharing resources of the network element;

sharers corresponding to the shares of the sharing resources of the network element; and over-thresholds for usages of the sharing resources of the network element; and the processing unit is configured to control the sharing resources of the network element according to the configuration information acquired by the acquiring unit.

Combined with the one aspect, in a first possible implementation way of the first aspect, the sharing types of the sharing resources include:

a dedicated resource, a mutual resource and a preemptive resource, the dedicated resource is a sharing resource of the network element which is allocated to at least one operator or at least one PLMN and is exclusively used by the at least one operator or the at least one PLMN, or a resource which is monopolized by at least one operator or at least one PLMN but is allowed to be shared with other operators or other PLMNs;

the mutual resource is a sharing resource of the network element which is allocated to at least one operator or at least one PLMN and is preferentially used by the at least one operator or the at least one PLMN, and is allowed to be rented to other operators or other PLMNs in a case that the at least one operator or the at least one PLMN does not use the sharing resource; and the preemptive resource is a resource which is usable for operators or PLMNs according to a chronological order for requesting the sharing resource and priorities for the operators and PLMNs.

Combined with the first aspect or the first possible implementation way of the first aspect, in a second possible implementation way of the first aspect, the sharing resources include one or any combination of: an air resource, a resource for transmission from the network element to other network elements, a resource of processing capability of the network element, and a storage resource of the network element.

Combined with the first aspect or the first possible implementation way of the first aspect, in a third possible implementation way of the first aspect, the sharing resources include:

resources used by a home operator or a home PLMN of a user equipment accessing the network element;

resources used by a current registered operator or a current registered PLMN of a user equipment accessing the network element; or resources used by a current service operator or a current service PLMN of a user equipment accessing the network element.

Combined with the third possible implementation way of the first aspect, in a fourth possible implementation way of the first aspect, the processing unit is specifically configured to determine whether to allocate needed resources to the user equipment according to usages of the sharing resources of the network element by the current registered operator, the current registered PLMN, the current service operator or the current service PLMN of the user equipment.

Combined with the first aspect, in a fifth possible implementation way of the first aspect, the network element includes: a sharing network element, an entity of policy and charging rule function PCRF, an AAA server or a policy server.

Combined with the fifth possible implementation way of the first aspect, in a sixth possible implementation way of the first aspect, the sharing element includes a network element of an access network, a network element of a core network or a network element of a subnet.

In a second aspect, a network element is also provided according to the disclosure. The network element includes an acquiring unit and a processing unit;

the acquiring unit is configured to acquire information about resource usage of sharing resources; and the processing unit is configured to control the sharing resources of the network element according to the information about resource usage acquired by the acquiring unit; where the information about resource usage includes one or any combination of the following:

identities or index numbers of sharing types of used sharing resources;

a user equipment using the sharing types of sharing resources, and a home operator or a home PLMN of the user equipment;

a user equipment which accesses the network element by using the sharing types of sharing resources, and an identity of a service network or a core network or a PLMN which the user equipment accesses or the type of a service provided for the user equipment;

shares or amounts for the used sharing resources or a proportion between the amount of the used sharing resources and amount of the total resources;

amounts or a ratio of the types of sharing resources which are used by operators or PLMNs;

billing rates corresponding to the types of sharing resources;

a period of time or numbers of times for using the types of sharing resources;

priorities of the types of sharing resources; and amounts or proportions of portions of the used sharing resources which exceed share limits.

Combined with the second aspect, in a first possible implementation way of the second aspect, the processing unit is specifically configured to determine usages of the shares of the resources in the network element for a current service operator or a current service PLMN of a user equipment transmitting a request for using resources according to the information about resource usage acquired by the acquiring unit, and determine whether to allocate needed resources to the user equipment according to the usages of the shares of the resources; or the processing unit is specifically configured to perform statistics on the types, shares or sharers of the sharing resources according to the information about resource usage acquired by the acquiring unit, to acquire usages of the types of sharing resources by operators or PLMNs represented by different sharers, and perform billing processing according to billing rates corresponding to the types of sharing resources; or the processing unit is specifically configured to report the information about resource usage acquired by the acquiring unit to an upstream network element or a billing network element.

Combined with the first possible implementation way of the second aspect, in a second possible way of the second aspect, the processing unit is specifically configured to allocate the sharing resources of the network element according to the priorities of the sharing resources, wherein the processing unit allocates a sharing resource with a high priority is allocated to the user equipment if the usage of the sharing resource with a high priority does not exceed a share limit, and the processing unit allocates a sharing resource with a low priority to the user equipment or the request for using resources is rejected if the usage of the sharing resource with a high priority exceeds a share limit.

Combined with the second aspect, in a third possible implementation way of the second aspect, the network element includes: a sharing network element, an entity of policy and charging rule function PCRF, an AAA server or a policy server.

Combined with the third possible implementation way of the second aspect, in a fourth possible implementation way of the second aspect, the sharing network element includes: a network element of an access network, a network element of a core network or a network element of a subnet.

In a third aspect, a method for sharing a network is also provided according to the disclosure. The method includes:

acquiring, by a network element, configuration information for resource sharing, wherein the configuration information includes one or any combination of the following:

sharing types of sharing resources of the network element;

division for shares of the sharing resources of the network element;

sharers corresponding to the shares of the sharing resources of the network element; and over-thresholds for usages of the sharing resources of the network element; and controlling, by the network element, the sharing resources of the network element according to the configuration information.

Combined with the third aspect, in a first possible implementation way of the third aspect, the sharing types of the sharing resources include:

a dedicated resource, a mutual resource and a preemptive resource, wherein the dedicated resource is a sharing resource of the network element which is allocated to at least one operator or at least one PLMN and is exclusively used by the at least one operator or the at least one PLMN, or a resource which is monopolized by at least one operator or at least one PLMN but is allowed to be shared with other operators or other PLMNs;

the mutual resource is a sharing resource of the network element which is allocated to at least one operator or at least one PLMN and is preferentially used by the at least one operator or the at least one PLMN, and is allowed to be rented to other operators or other PLMNs in a case that the at least one operator or at least one PLMN does not use the sharing resource; and the preemptive resource is a resource which is usable for operators or PLMNs according to a chronological order for requesting the sharing resource and priorities for the operators and PLMNs.

Combined with the third aspect or the first possible implementation way of the third aspect, in a second possible implementation way of the third aspect, the sharing resources include one or any combination of: an air resource, a resource for transmission from the network element to other network elements, a resource of processing capability of the network element, and a storage resource of the network element.

Combined with the third aspect or the first possible implementation way of the third aspect, in a third possible implementation way of the third aspect, the sharing resources include:

resources used by a home operator or a home PLMN of a user equipment accessing the network element;

resources used by a current registered operator or a current registered PLMN of a user equipment accessing the network element; or resources used by a current service operator or a current service PLMN of a user equipment accessing the network element.

Combined with the third possible implementation way of the third aspect, in a fourth possible implementation way of the third aspect, the process of controlling, by the network element, the sharing resources of the network element according to the configuration information includes:

determining, by the network element, whether to allocate needed resources to the user equipment according to usages of the sharing resources of the network element by the current registered operator, the current registered PLMN, the current service operator or the current service PLMN of the user equipment.

In a fourth aspect, a method for sharing a network is also provided according to the disclosure. The method includes:

acquiring, by the network element, information about resource usage of sharing resources; and controlling, by the network element, the sharing resources of the network element according to the information about resource usage, wherein the information about resource usage includes one or any combination of the following:

identities or index numbers of sharing types of used sharing resources;

a user equipment using the sharing types of sharing resources, and a home operator or a home PLMN of the user equipment;

a user equipment which accesses the network element by using the sharing types of sharing resources, and an identity of a service network or a core network or a PLMN which the user equipment accesses or the type of a service provided for the user equipment;

shares or amounts for the used sharing resources or a proportion between the amount of the used sharing resources and amount of the total resources;

amounts or a ratio of the types of sharing resources which are used by operators or PLMNs;

billing rates corresponding to the types of sharing resources;

a period of time or numbers of times for using the types of sharing resources;

priorities of the types of sharing resources; and amounts or proportions of portions of the used sharing resources which exceed share limits.

Combined with the fourth aspect, in a first possible implementation way of the fourth aspect, the controlling, by the network element, the sharing resources of the network element according to the information about resource usage includes:

determining, by the network element, usages of the shares of the resources in the network element for a current service operator or a current service PLMN of a user equipment transmitting a request for using resources according to the information about resource usage, and determining whether to allocate needed resources to the user equipment according to the usages of the shares of the resources; or performing, by the network element, statistics on the types, shares or sharers of the sharing resources according to the information about resource usage, to acquire usages of the sharing types of the sharing resources by operators or PLMNs represented by different sharers, and performing billing processing according to billing rates corresponding to the types of sharing resources; or reporting, by the network element, the information about resource usage to an upstream network element or a billing network element.

Combined with the first possible implementation way of the fourth aspect, in a second possible implementation way of the fourth aspect, the determining whether to allocate needed resources to the user equipment according to the usages of the shares of the resources includes:

allocating, by the network element, the sharing resources of the network element according to the priorities of the sharing resources, wherein a sharing resource with a high priority is allocated to the user equipment if the usage of the sharing resource with a high priority does not exceed a share limit, and a sharing resource with a low priority is allocated to the user equipment if the usage of the sharing resource with a high priority exceeds a share limit or the request for using resources is rejected.

With the method for sharing a network and a network element provided according to the disclosure, shares of sharing resources are configured by using a network management system, the network element controls a UE according to the shares, and a billing system performs respective billings on different operators according to usages of the shares, thereby may implement accurate control on the shares of operators or PLMNs in the sharing network, and implement control management for access or migration of the user equipment.

DESCRIPTION

Technical solutions of the disclosure are further described in detail with reference to the drawings and embodiments in the following.

With a method for sharing a network and a network element according to embodiments of the disclosure, which may be applicable to a sharing network with multiple operators or multiple PLMNs, shares for sharing resources of network elements in the sharing network are allocated, and access, migration and billing of user equipments for different operators or PLMNs are controlled. The sharing resources of the network element may include: an air resource (frequency spectrum and time slot of radio resource), a resource for transmission from the network element to other network elements, a resource of processing capability of the network element, a storage resource of the network element, radio bearing links, a bearing resource for user plane and a bearing resource for control plane, etc.

The network element in the sharing network according to the disclosure may be a sharing network element, an entity of policy and charging rule function (PCRF), an authentication, authorization and accounting (AAA) server or a policy server, etc. The sharing network element may be a network element of an access network, a network element of a core network or a network element of a subnet, etc.

Figure 1:
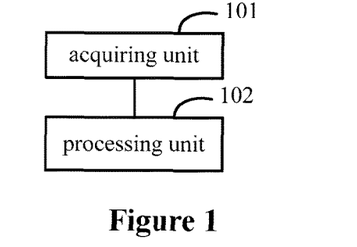
FIG. 1 is a schematic structural diagram of a network element according to an embodiment of the disclosure.

FIG. 1 is a structural schematic diagram of a network element according to an embodiment. As shown in FIG. 1, the network element according to the disclosure includes an acquiring unit 101 and a processing unit 102.

The acquiring unit 101 is configured to acquire configuration information for resource sharing.

The configuration information may include: a sharing type of sharing resources of the network element, division for shares of the sharing resources of the network element, sharers corresponding to the shares of the sharing resources of the network element, over-thresholds for usages of the sharing resources of the network element, etc.

The sharing type of the sharing resources includes: a dedicated resource, a mutual resource, a preemptive resource.

The dedicated resource is a sharing resource of the network element which is allocated to at least one operator or at least one PLMN and is exclusively used by the at least one operator or the at least one PLMN, or a resource which is monopolized by at least one operator or at least one PLMN but is allowed to be shared with other operators or other PLMNs.

In a case that the type of the sharing resource is the dedicated resource, the sharing resource of the network element is monopolized by an operator or a PLMN corresponding to the dedicated resource. A portion of the resources of the network element is divided for exclusive use by a certain operator or a certain PLMN. The portion of the resources may only be monopolized by the corresponding operator or the corresponding PLMN, and may not be occupied by other sharers no matter whether the other sharers need the portion of the resources. The operator or PLMN may only learn its dedicated resource and may not learn dedicated resources for other operators or other PLMNs.

The mutual resource is a sharing resource of the network element which is allocated to at least one operator or at least one PLMN and is preferentially used by the at least one operator or the at least one PLMN, and is allowed to be rented to other operators or other PLMNs in a case that the at least one operator or the at least one PLMN does not use the sharing resource.

In a case that the type of the sharing resource is the mutual resource, the sharing resource of the network element is preferentially used by an owner of the mutual resource, and other operators or other PLMNs are allowed to borrow or rent the mutual resource in a case that the owner does not use the sharing resource. A portion of the resources of the network element is divided and belongs to an operator or a PLMN, and in a case that the operator or the PLMN does not use the portion of the resources and other operators or other PLMNs are short of resource, the other operators or the other PLMNs may borrow or rent the mutual resource. In a case that the operator or the PLMN to which the mutual resource belongs is short of resource, the operator or the PLMN has a priority to use the mutual resource belonging to the operator or the PLMN. In other words, if the operator or the PLMN is in a conflict of use of the mutual resource with other operators or other PLMNs, the operator or the PLMN (owner) may migrate the other operators or the other PLMNs occupying the mutual resource or reject continuous use by the other operators or the other PLMNs. The operator or the PLMN may learn both its own mutual resource and the mutual resource for the other operators or the other PLMNs.

All operators or PLMNs can use the preemptive resource according to a chronological order for requesting the sharing resource and priorities for the operators or the PLMNs.

In a case that the type of the sharing resource is the preemptive resource, any operator or any PLMN freely requests for preemption of the sharing resource of the network or any PLMN freely requests for preemption of the sharing resource of the network element. The preemptive resource is not resource monopolized or reserved by any operator or any PLMN, thus in case of resource shortage, any operator or any PLMN may freely request for the preemptive resource without being limited by other operators or other PLMNs. The preemptive resource may be preempted by any operator or PLMN in case of no configuration of shares of the preemptive resource. Alternatively, a ratio of the preemptive resource which are preempted by operators or PLMNs may be specified. For example, in a case that an operator A and an operator B share a network element which includes the preemptive resource, a ratio of the preemptive resource preemptible to the operator A to the preemptive resource preemptible to the operator B is 1:3, which indicates that if the preemptive resource of the network element is divided into four pieces, the operator A may use no more than one piece of the preemptive resource, and the operator B may occupy three pieces of the preemptive resource, in other words, the upper limit of preemptive resource that the operator B can preempt is three times as that of the operator A.

In configuration information of a network management system, shares of different types of the sharing resources in the network element are allocated. For example, for the operator A and the operator B, respective allocated shares for the dedicated resource are 30% and 30%, allocated shares for the mutual resource are 15% and 15%, and allocated shares for the preemptive resource is 10%, where a ratio of the preemptive resource which are preemptible to the operator A to the preemptive resource preemptible to the operator B is 1:3.

Figure 2A:
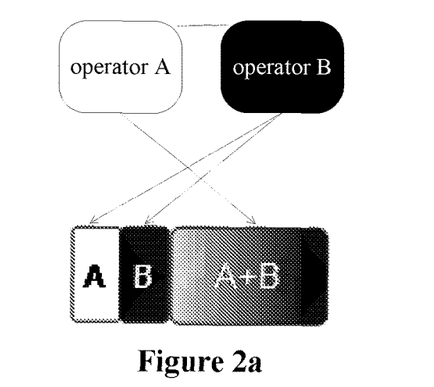
FIG. 2a is a schematic diagram of a first scenario for a sharing network according to an embodiment of the disclosure.
Figure 2B:
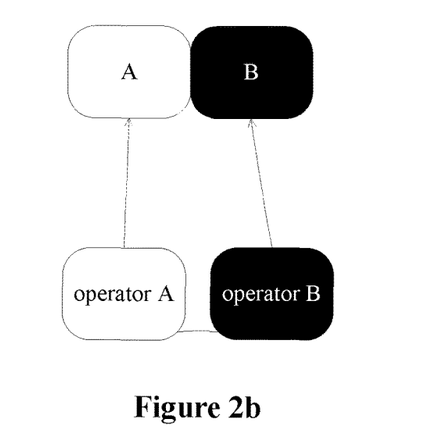
FIG. 2b is a schematic diagram of a second scenario for a sharing network according to an embodiment of the disclosure.
Figure 2C:
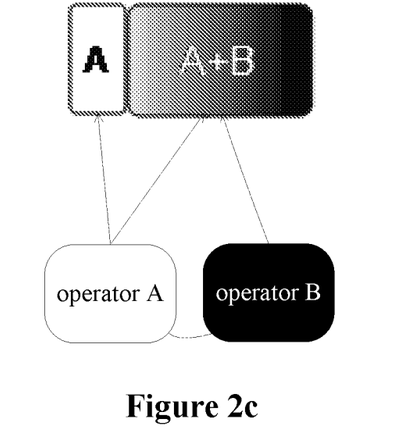
FIG. 2c is a schematic diagram of a third scenario for a sharing network according to an embodiment of the disclosure.

Indeed, the shares allocated to different operators may be flexibly set according to actual usage scenarios. As shown in FIG. 2a, in this scenario, the sharing resources of the network element are divided into dedicated resource for the operator A, dedicated resource for the operator B and the preemptive resource, which have respective shares of 20%, 20% and 60%. As shown in FIG. 2b, in this scenario, the sharing resources of the network element are divided into dedicated resource for the operator A, and dedicated resource for the operator B, which have respective shares of 50% and 50%. As shown in FIG. 2c, in this scenario, the sharing resources of the network element are divided into dedicated resource for the operator A and preemptive resource, which have respective shares of 20% and 80%.

Optionally, the configuration information of the network management system includes one or any combination of following listed items a-f:

(a) identities for types of shares of resources, such as an identity representing one of the above three types;

(b) identities of allocated-to operators or PLMNs;

(c) an amount or a percentage of shares of resources which are allocated to different operators or PLMNs;

(d) for the preemptive resource, a ratio of occupation for different operators;

(e) a priority of different types of the sharing resources, which is configured to determine which type of the sharing resource is preferentially allocated to a UE of an operator or a PLMN, in a case that a share of sharing resource of the network element allocated to the operator or the PLMN is not enough; and (f) different billing rates for the different types of resources, which are configured for billing processing after the network element performs statistics on different types of the sharing resources which are occupied by operators or PLMNs.

The processing unit 102 is configured to control the sharing resources of the network element according to the configuration information acquired by the acquiring unit.

The sharing resources of the network element include: resources used by a home operator or a home PLMN of a user equipment accessing the network element, resources used by a current registered operator or a current registered PLMN of a user equipment accessing the network element, or resources used by a current service operator or a current service PLMN of a user equipment accessing the network element.

The control on the sharing resources of the network element by the processing unit 102 includes: a first way of configuring, by the processing unit 102, the sharing resources of the network element according to the configuration information; and a second way of performing, by the processing unit 102, access control on the user equipment requesting access according to the configuration information.

For the control in the second way, the processing unit 102 determines the sharing types of the operator or PLMN, and/or the shares for the operator or PLMN, and/or resources used by the operator or PLMN, and then performs access control on the user equipment requesting access.

The processing unit 102 determines the resources used by the user equipment as resources used by the home operator or the home PLMN of the user equipment; or the processing unit 102 determines the resources used by the user equipment as resources used by the registered operator or the registered PLMN of the user equipment; or the processing unit 102 determines the resources used by the user equipment as resources used by the current service operator or the current service PLMN of the user equipment.

The processing unit 102 determines whether to allocate needed resources to the user equipment for access control on the user equipment requesting access according to usage of the sharing resources of the network element by the current registered operator, the current registered PLMN, the current service operator or the current service PLMN of the user equipment. If the processing unit 102 determines that the needed resources may be allocated to the user equipment, the processing unit 102 enables the user equipment to access corresponding sharing resources.

Optionally, in the case that different sharing types have different priorities, the processing unit 102 allocates the needed resources to the user equipment according to the priorities of the sharing types, and if usage of the sharing resources with a high priority exceeds a share limit, the sharing resources with a low priority is allocated or the request for using the resources is rejected.

In general, the priority of the dedicated resource is higher than that of the mutual resource or that of the preemptive resource. Thus, in a case that the user equipment accesses the sharing resources which correspond to the user equipment, the resource allocation includes: determining whether the dedicated resource for a home operator or a home PLMN of the accessed user equipment is idle, enabling the accessed user equipment to access the dedicated resource in the case of positive determination, or enabling the user equipment to access another sharing resource in the case of negative determination. The three types of sharing resources correspond to respective priorities or an order for use. In a case that a UE homing to operators or PLMNs sharing the resources accesses the sharing network element, the network element preferentially allocates a certain type of resource to the UE according to the priorities or the orders of use. And in case of resource shortage, the UE accesses another type of resource according to the priorities or the orders of use.

For the control in the second way, the processing unit 102 acquires information about resource usage of the sharing resources of the network element through the acquiring unit 101, then performs access control on the user equipment requesting access (user equipment transmitting a request for using resources) or perform billing on the accessed user equipment according to the information about resource usage.

The information about resource usage acquired by the acquiring unit 101 includes one or any combination of following items of information: identities of operators or PLMNs using the sharing resources, sharing types for used sharing resources, shares or amounts of the used sharing resources, proportion between the used sharing resources and the total sharing resources, and amounts or proportions of the used sharing resources which exceed share limits.

The processing unit 102 determines whether to allocate needed resources to the user equipment according to the information about resource usage.

The information about resource usage acquired by the acquiring unit 101 may further include: types for the sharing resources, shares for the sharing resources, or billing rates corresponding to sharers. The processing unit 102 performs statistics on the types, shares or sharers of the sharing resources, to acquire usages of different types of the sharing resources by operators or PLMNs represented by different sharers, and report the usages or the corresponding billing rates, thereby performing billing processing.

It should be noted that the billing processing may be performed in the network element according to the embodiment of the disclosure, or is not performed in the network element but reported to a control entity such as a billing system, a webmaster or a network element of a core network to perform processing. Therefore, after the acquiring unit acquires the usages of different types of the sharing resources by operators or PLMNs represented by different sharers, the processing unit 102 may further generate a data report based on the usages of the sharing resources, and report the data report to the network management system or an entity with billing function.

Figure 3:
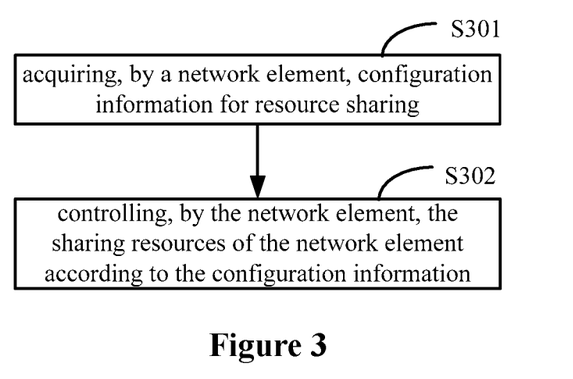
FIG. 3 is a flow chart of a method for sharing a network according to an embodiment of the disclosure.

Specially, FIG. 3 is a flow chart of a method for sharing a network according to an embodiment of the disclosure. As shown in FIG. 3, the method according to the disclosure includes steps S301 and S302.

S301 includes: acquiring, by a network element, configuration information for resource sharing.

The configuration information may include: a sharing type of sharing resources of the network element, division for shares of the sharing resources of the network element, sharers corresponding to the shares of the sharing resources of the network element, over-thresholds for usages of the sharing resources of the network element, etc.

The sharing type of the sharing resources includes: a dedicated resource, a mutual resource, a preemptive resource.

The dedicated resource is a sharing resource of the network element which is allocated to at least one operator or at least one PLMN and is exclusively used by the at least one operator or at least one PLMN, or a resource which is monopolized by at least one operator or at least one PLMN but is allowed to be shared with other operators or other PLMNs.

In a case that the type of the sharing resource is the dedicated resource, the sharing resource of the network element is monopolized by an operator or a PLMN corresponding to the dedicated resource. A portion of the resources of the network element is divided for exclusive use by a certain operator or a certain PLMN. The portion of the resources may only be monopolized by the corresponding operator or the corresponding PLMN, and may not be occupied by other sharers no matter whether the other sharers need the portion of the resources. The operator or PLMN may only learn its dedicated resource and may not learn dedicated resources for other operators or other PLMNs.

The mutual resource is a sharing resource of the network element which is allocated to at least one operator or at least one PLMN and is preferentially used by the at least one operator or at least one PLMN, and is allowed to be rented to other operators or other PLMNs in a case that the at least one operator or at least one PLMN does not use the sharing resource.

In a case that the type of the sharing resource is the mutual resource, the sharing resource of the network element is preferentially used by an owner of the mutual resource, and other operators or other PLMNs are allowed to borrow or rent the mutual resource in a case that the owner does not use the sharing resource. A portion of the resources of the network element is divided and belongs to an operator or a PLMN, and in a case that the operator or the PLMN does not use the portion of the resources and other operators or other PLMNs are short of resource, the other operators or the other PLMNs may borrow or rent the mutual resource. In a case that the operator or the PLMN to which the mutual resource belongs is short of resource, the operator or the PLMN has a priority to use the mutual resource belonging to the operator or the PLMN. In other words, if the operator or the PLMN is in a conflict of use of the mutual resource with other operators or other PLMNs, the operator or the PLMN (owner) may migrate the other operators or the other PLMNs occupying the mutual resource or reject continuous use by the other operators or the other PLMNs. The operator or the PLMN may learn both its own mutual resource and the mutual resource for the other operators or the other PLMNs.

All operators or PLMNs can use preemptive resource based on a chronological order for requesting the sharing resource and priorities for the operators or the PLMNs.

In a case that the type of the sharing resource is the preemptive resource, any operator or any PLMN freely requests for preemption of the sharing resource of the network element. The preemptive resource is not resource monopolized or reserved by any operator or any PLMN, thus in case of resource shortage, any operator or any PLMN may freely request for the preemptive resource without being limited by other operators or other PLMNs. The preemptive resource may be preempted by any operator or PLMN in case of no configuration of shares of the preemptive resource. Alternatively, a ratio of the preemptive resource which are preempted by operators or PLMNs may be specified. For example, in a case that an operator A and an operator B share a network element which includes the preemptive resource, a ratio of the preemptive resource preemptible to the operator A to the preemptive resource preemptible to the operator B is 1:3, which indicates that if the preemptive resource of the network element is divided into four pieces, the operator A may use no more than one piece of the preemptive resource, and the operator B may occupy three pieces of the preemptive resource, in other words, the upper limit of preemptive resource that the operator B can preempt is three times as that of the operator A.

In configuration information of a network management system, shares of different types of the sharing resources in the network element are allocated. For example, for the operator A and the operator B, respective allocated shares for the dedicated resource are 30% and 30%, allocated shares for the mutual resource are 15% and 15%, and allocated shares for the preemptive resource is 10%, and a ratio of the preemptive resource which are preemptible to the operator A to the preemptive resource preemptible to the operator B is 1:3.

Indeed, the shares allocated to different operators may be flexibly set according to actual usage scenarios. As shown in FIG. 2a, in this scenario, the sharing resources of the network element are divided into dedicated resource for the operator A, dedicated resource for the operator B and the preemptive resource, which have respective shares of 20%, 20% and 60%. As shown in FIG. 2b, in this scenario, the sharing resources of the network element are divided into dedicated resource for the operator A, and dedicated resource for the operator B, which have respective shares of 50% and 50%. As shown in FIG. 2c, in this scenario, the sharing resources of the network element are divided into dedicated resource for the operator A and preemptive resource, which have respective shares of 20% and 80%.

Optionally, the configuration information of the network management system includes one or any combination of following listed items a-f:

(a) identities for types of shares of resources, such as an identity representing one of the above three types;

(b) identities of allocated-to operators or PLMNs;

(c) an amount or a percentage of shares of resources which are allocated to different operators or PLMNs;

(d) for the preemptive resource, a ratio of occupation for different operators;

(e) a priority of different types of the sharing resources, which is configured to determine which type of the sharing resource is preferentially allocated to a UE of an operator or a PLMN, in a case that a share of sharing resource of the network element allocated to the operator or the PLMN is not enough; and (f) different billing rates for the different types of resources, which are configured for billing processing after the network element performs statistics on different types of the sharing resources which are occupied by operators or PLMNs.

S102 includes: controlling, by the network element, the sharing resources of the network element according to the configuration information.

The configuration information of the network management system may be directly configured in the sharing network element, or, the configuration information may be configured in a policy server or an entity of PCRF connected to the sharing network element and then be dynamically downloaded to the sharing network element or the AAA server when the network is running.

The sharing resources of the network element include: resources used by a home operator or a home PLMN of a user equipment accessing the network element, or resources used by a current registered operator or a current registered PLMN of a user equipment accessing the network element, or resources used by a current service operator or a current service PLMN of a user equipment accessing the network element.

The control on the sharing resources of the network element by the network element includes: a first way of configuring, by the network element, the sharing resources of the network element according to the configuration information; and a second way of performing, by the network element, access control on the user equipment requesting access according to the configuration information.

For the control in the first way, the process of configuring the sharing resources of the network element includes: determining, by the network element, the sharing types for the operator or PLMN, and/or the shares for the operator or PLMN, and/or resources used by the operators or the PLMNs, and performing access control on the user equipment requesting access.

The process of determining, by the network element, resources used by the operator or PLMN includes: determining the resources used by the user equipment as resources used by the home operator or the home PLMN of the user equipment; or determining the resources used by the user equipment as resources used by the registered operator or the registered PLMN of the user equipment; or determining the resources used by the user equipment as resources used by the current service operator or the current service PLMN of the user equipments.

The process of performing access control on the user equipment requesting access specially includes: determining, by the network element, whether to allocate needed resources to the user equipment according to usages of the sharing resources of the network element by the current registered operator, the current registered PLMN, the current service operator or the current service PLMN of the user equipment. If it is determined that the needed resources may be allocated to the user equipment, the network element enables the user equipment to access corresponding sharing resources.

Optionally, in the case that different sharing types have different priorities, after the process of determining to allocate the needed resources to the user equipment, the method further includes: allocating the needed resources to the user equipment according to the priorities of the sharing types, and if usage of the sharing resources with a high priority exceeds a share limit, allocating the sharing resources with a low priority or rejecting the request for using the resources.

In general, the priority of the dedicated resource is higher than that of the mutual resource or that of the preemptive resource. Thus, in a case that the user equipment accesses the sharing resources which correspond to the user equipment, the method includes: determining whether the dedicated resource for a home operator or a home PLMN of the accessed user equipment is idle, enabling the accessed user equipment to access the dedicated resource in the case of positive determination, or enabling the user equipment to access another sharing resource in the case of negative determination. The three types of sharing resources correspond to respective priorities or an order for use. In a case that a UE homing to operators or PLMNs sharing the resources accesses the sharing network element, the network element preferentially allocates a certain type of resource to the UE according to the priorities or the orders of use. And in case of resource shortage, the UE accesses another type of resource according to the priorities or the orders of use.

For the control in the second way, the process of performing access control on the user equipment requesting access according to the configuration information includes: acquiring information about resource usage of the sharing resources of the network element, and performing access control on the user equipment requesting access (user equipment transmitting a request for using resources) or performing billing on the accessed user equipment according to the information about resource usage.

The information about resource usage includes one or any combination of following items of information: identities of operators or PLMNs using the sharing resources, sharing types for used sharing resource, shares or amounts of the used sharing resources, proportion between the used sharing resources and the total sharing resources, and amounts or proportions of the used sharing resources which exceed share limits.

The information about resource usage may further include: types for the sharing resources, shares for the sharing resources, or billing rates corresponding to sharers. After the process of performing access control on the user equipment requesting access according to the configuration information, the method further includes: performing statistics on the types, shares or sharers of the sharing resources, to acquire usages of different types of the sharing resources by operators or PLMNs represented by different sharers, reporting the usages or corresponding billing rates, and performing billing processing.

It should be noted that the billing processing may be performed in the network element, or, the network element may report the billing processing to a control entity such as a billing system, a webmaster or a network element of a core network to perform processing. Therefore, after the process of acquiring usage of different types of the sharing resources by operators or PLMNs represented by different sharers, the method may further include: generating a data report based on the usages of the sharing resources, and reporting the data report to the network management system or an entity with billing function.

With the method for sharing a network according to the embodiments of the disclosure, a network element controls a UE according to information about shares of sharing resource which are configured by a network management system, and statistics is performed on usages of the shares of the respective resources, for a billing system to perform respective billings on different operators in the sharing network, thereby implementing accurate control on the shares of operators or PLMNs in the sharing network, and implementing control management for access or migration of the user equipment.

The network element and the method for sharing a network according to the embodiments of the disclosure are also applicable to the case in which access control is directly performed. Referring to FIG. 1, in this case, the acquiring unit 401 is configured to acquire information about resource usage of sharing resources.

The information about resource usage may include: identities or index numbers of sharing types of used sharing resources; a user equipment using the types of sharing resources and a home operator or a home PLMN of the user equipment; a user equipment which accesses the network element by using all the types of the sharing resources, and an identity of a service network or a core network or a PLMN which the user equipment accesses or a type of a service provided for the user equipment; shares or amounts for the used sharing resources or proportion between the amount of the used sharing resources and the amount of total resources; amounts of each of the types of sharing resources which are used by each of operators or PLMNs or a ratio thereof to the sharing resources; billing rates corresponding to the types of sharing resources; a period of time or numbers of times for using each of the types of sharing resources; priorities of the types of sharing resources; amounts or proportions of portions of the used sharing resources which exceed share limits.

The processing unit 102 is configured to control the sharing resources of the network element according to the information about resource usage acquired by the acquiring unit 101.

The processing unit 102 is configured to determine usages of the shares of the resources in the network element for a current service operator or a current service PLMN of a user equipment transmitting a request for using resources according to the information about resource usage acquired by the acquiring unit, and determine whether to allocate needed resources to the user equipment according to the usages of the shares of the resources.

Or, the processing unit 102 is configured to perform statistics on the types, shares or sharers of the sharing resources according to the information about resource usage acquired by the acquiring unit 101, to acquire usages of the types of sharing resources by operators or PLMNs represented by different sharers, and perform billing processing according to billing rates corresponding to the types of sharing resources.

Or, the processing unit 102 is configured to report the information about resource usage acquired by the acquiring unit 101 to an upstream network element or a billing network element.

Optionally, in a case that the information about resource usage acquired by the acquiring unit 101 includes priorities of the sharing resources, the processing unit 102 allocates the sharing resources of the network element according to the priorities of the sharing resources.

If usage of a sharing resource with a high priority does not exceed a share limit, the processing unit 102 preferentially allocates a sharing resource with a high priority to the user equipment. If usage of the sharing resource with a high priority exceeds a share limit, the processing unit 102 preferentially allocates a sharing resource with a low priority to the user equipment or rejects the request for using resources.

Figure 4:
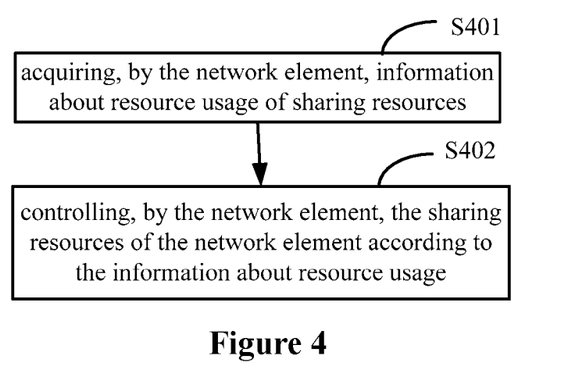
FIG. 4 is a flow chart of a method for sharing a network according to an embodiment of the disclosure.

Correspondingly, FIG. 4 is a flow chart of a method for sharing a network according to another embodiment of the disclosure. As shown in FIG. 4, the method according to the disclosure includes steps S401 and S402.

S401 includes: acquiring, by the network element, information about resource usage of sharing resources.

The information about resource usage may include: identities or index numbers of sharing types of used sharing resources; a user equipment using the types of sharing resources and a home operator or a home PLMN of the user equipment; a user equipment which accesses the network element by using all the types of the sharing resources, and an identity of a service network or a core network or a PLMN which the user equipment accesses or a type of a service provided for the user equipment; shares or amounts for the used sharing resources or proportion between the amount of the used sharing resources and the amount of total resources; amounts of each of the types of sharing resources which are used by each of operators or PLMNs or a ratio thereof to the sharing resources; billing rates corresponding to the types of sharing resources; a period of time or numbers of times for using each of the types of sharing resources; priorities of the types of sharing resources; amounts or proportions of portions of the used sharing resources which exceed share limits.

S402 includes: controlling, by the network element, the sharing resources of the network element according to the information about resource usage.

The process of controlling the sharing resources of the network element according to the information about resource usage includes:

determining, by the network element, usages of the shares of the resources in the network element by a current service operator or a current service PLMN of a user equipment transmitting a request for using resources according to the information about resource usage, and determining whether to allocate needed resources to the user equipment according to the usages of the shares of the resource; or performing, by the network element, statistics on the types, shares or sharers of the sharing resources, according to the information about resource usage, to acquire usages of the different types of sharing resources by operators or PLMNs represented by different sharers, and performing billing processing according to billing rates corresponding to the different types of sharing resources; or reporting, by the network element, the information about resource usage to an upstream network element or a billing network element.

The process of determining whether to allocate needed resources to the user equipment according to the usages of the shares of the resource includes: allocating, by the network element, the sharing resources of the network element according to priorities of the sharing resources, in which the sharing resource with a high priority is allocated to the user equipment if usage of the sharing resource with a high priority does not exceed a share limit, or the sharing resource with a low priority is allocated to the user equipment if usage of the sharing resource with a high priority exceeds a share limit or the request for using resources is rejected.

Figure 5:
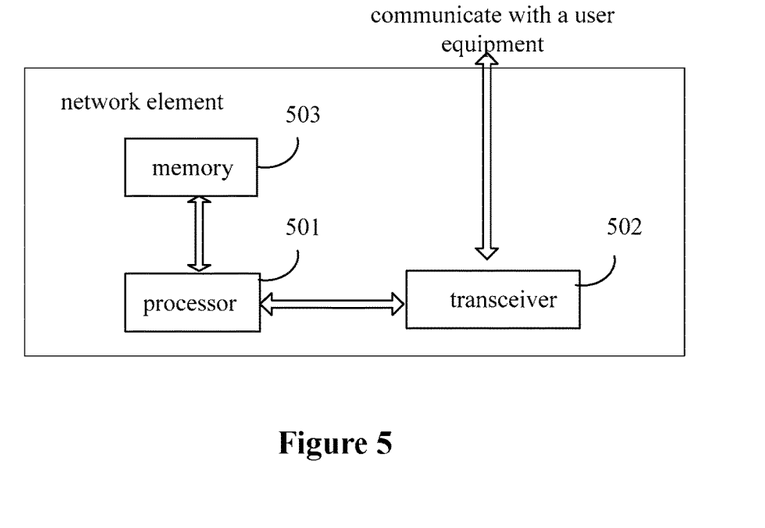
FIG. 5 is a schematic structural diagram of a network element according to an embodiment of the disclosure.

FIG. 5 is a schematic structural diagram of a network element according to an embodiment of the disclosure. As shown in FIG. 5, the network element includes: a processor 501, a transceiver 502 and a memory 503.

The processor 501 may be a single-core or multi-core central processing unit (CPU), an application specific integrated circuit (ASIC), or one or more integrated circuits configured to implement the embodiments of the disclosure.

The transceiver 502 is configured to interact with a user equipment.

The memory 503 is configured to store program.

The processor 501 invokes the program stored in the memory 503 to execute:

acquiring configuration information for resource sharing; and controlling sharing resources of the network element according to the configuration information.

The configuration information includes one or any combination of following:

a sharing type of the sharing resources of the network element;

division for shares of the sharing resources of the network element;

sharers corresponding to the shares of the sharing resources of the network element; and over-thresholds for usages of the sharing resources of the network element.

Furthermore, the sharing type of the sharing resources includes a dedicated resource, a mutual resource, a preemptive resource.

Furthermore, the sharing resource may include one or any combination of an air resource, a resource for transmission from the network element to other network elements, a resource of processing capability of the network element, and a storage resource of the network element.

Furthermore, the sharing resources of the network element include: resources used by a home operator or a home PLMN of a user equipment accessing the network element, resources used by a current registered operator or a current registered PLMN of the user equipment accessing the network element, or resources used by a current service operator or a current service PLMN of the user equipment accessing the network element.

Furthermore, the processor 501 is configured to determine whether to allocate needed resources to the user equipment according to usages of the sharing resources of the network element by the current registered operator, the current registered PLMN, the current service operator or the current service PLMN of the user equipment.

The processor 501 is further configured to:

acquire information about resource usage of the sharing resources; and control the sharing resources of the network element according to the information about resource usage.

The information about resource usage may include: identities or index numbers of sharing types of used sharing resources; a user equipment using the types of sharing resources and a home operator or a home PLMN of the user equipment; a user equipment which accesses the network element by using all the types of the sharing resources, and an identity of a service network or a core network or a PLMN which the user equipment accesses or a type of a service provided for the user equipment; shares or amounts for the used sharing resources or proportion between the amount of the used sharing resources and the amount of total resources; amounts of each of the types of sharing resources which are used by each of operators or PLMNs or a ratio thereof to the sharing resources; billing rates corresponding to the types of sharing resources; a period of time or numbers of times for using each of the types of sharing resources; priorities of the types of sharing resources; amounts or proportions of portions of the used sharing resources which exceed share limits.

The processor 501 is further configured to: determine usages of the shares of the resources in the network element by a current service operator or a current service PLMN of the user equipment transmitting a request for using resources according to the information about resource usage, and determine whether to allocate needed resources to the user equipment according to the usages of the shares of the resources; or perform statistics on the types, shares or sharers of the sharing resource, according to the information about resource usage, to acquire usages of different types of the sharing resources by operators or PLMNs represented by different sharers, and perform billing processing according to billing rates corresponding to the different types of sharing resources; or report the information about resource usage to an upstream network element or a billing network element.

The processor 501 is further configured to allocate the sharing resources of the network element according to priorities of the sharing resources, in which the processor allocates the sharing resource with a high priority to the user equipment if usage of the sharing resource with a high priority does not exceed a share limit, or the processor allocates the sharing resource with a low priority to the user equipment if usage of the sharing resource with a high priority exceeds a share limit or rejects the request for using resources.

Specially, the network element may execute the method for sharing a network as shown in FIG. 2a to FIG. 4, which is not described herein.

With the method for sharing a network and a network element provided according to the disclosure, through configuration information for shares of sharing resources in a network management system, the network element controls a UE according to share configuration in the configuration information, and statistics is performed on usages of the shares of the resources, for a billing system to perform respective billings on different operators in the sharing network, thereby implementing accurate control on the shares of the operators or the PLMNs in the sharing network, and implementing control management for access or migration of the user equipment.

Persons of skill in the art may further realize that the units and steps of algorithms in examples described according to the disclosed embodiments of the disclosure may be implemented as electronic hardware, computer software or a combination thereof. To clearly illustrate interchangeability between the hardware and software, constitution and steps in the examples are described in general according to functions in the foregoing description. Whether these functions are executed by means of hardware or software depends on special applications for technical solutions and constraint condition of design. The persons of skill in the art may use different methods to implement the described functions for each special application, but this implementation should not be regarded as departing from the scope of the disclosure.

The steps of the method or the algorithm described according to the embodiment of the disclosure may be directly implemented by using hardware, a software module executed by a processor or a combination of the hardware and the software. The software may be disposed in a random access memory (RAM), a memory, a read-only memory (ROM), an electrically programmable ROM, a register, a hard disk, a removable disk, a CD-ROM or a storage medium in any other forms known in the art.

The above embodiments further describe the purpose, technical solutions and beneficial effects, it should be understood that the foregoing embodiments are only preferred embodiments of the disclosure and are not meant to limit the disclosure, modifications, equivalent replacements and improvements within the spirit and the principle of the disclosure fall in the scope of the disclosure.

What is claimed is:

1. A network device comprising a processor and a memory, wherein the memory is configured to store program used to execute a process for sharing a network, the processor is configured to execute the program stored in the memory, wherein execution of the program causes the processor to:

acquire information about resource usage of sharing resources; and control the sharing resources of the network device according to the information about resource usage;

wherein the information about resource usage comprises one or any combination of the following:

identities or index numbers of sharing types of used sharing resources, information about a user equipment using the types of sharing resources, and information about a home operator or a home public land mobile network (PLMN) of the user equipment, information about a user equipment which accesses the network device using all the types of sharing resources, and an identity of a service network or a core network or a PLMN which the user equipment accesses or a type of a service provided for the user equipment, shares or amounts for the used sharing resources or a proportion between an amount of the used sharing resources and an amount of the total resources, amounts of each of the types of sharing resources which are used by each of operators or PLMNs or a ratio thereof to the sharing resources, billing rates corresponding to the types of used sharing resources, a period of time or numbers of times for using each of the types of sharing resources, priorities of the types of used sharing resources, and amounts or proportions of portions of the used sharing resources which exceed share limits;

wherein the sharing types of the used sharing resources comprise: a dedicated resource, a mutual resource or a preemptive resource, wherein the dedicated resource is a sharing resource of the network element which is allocated to at least one operator or at least one PLMN and is exclusively used by the at least one operator or the at least one PLMN, or a resource which is monopolized by at least one operator or at least one PLMN but is allowed to be shared with other operators or other PLMNs, the mutual resource is a sharing resource of the network element which is allocated to the at least one operator or the at least one PLMN and is preferentially used by the at least one operator or the at least one PLMN, and is allowed to be rented to other operators or other PLMNs in a case that the at least one operator or the at least one PLMN does not use the sharing resource, and the preemptive resource is a resource which is usable for operators or PLMNs according to a chronological order for requesting the sharing resource and priorities for the operators and PLMNs.

2. The network device according to claim 1, wherein the processor is configured to determine usages of the shares of the resources in the network device for a current service operator or a current service PLMN of a user equipment transmitting a request for using resources according to the information about resource usage, and determine whether to allocate needed resources to the user equipment according to the usages of the shares of the resources.

3. The network device according to claim 2, wherein the processor is configured to allocate the sharing resources of the network device according to the priorities of the sharing resources, wherein the processor allocates a sharing resource with a high priority to the user equipment if the usage of the sharing resource with a high priority does not exceed a share limit, and the processor is configured to allocate a sharing resource with a low priority to the user equipment or reject the request for using resources if the usage of the sharing resource with a high priority exceeds a share limit.

4. The network device according to claim 1, wherein the processor is configured to generate statistics on the types, shares or sharers of the sharing resources according to the information about resource usage, to acquire usages of the types of sharing resources by operators or PLMNs represented by different sharers, and perform billing processing according to billing rates corresponding to the types of sharing resources.

5. The network device according to claim 1, wherein the processor is configured to report the information about resource usage to an upstream network element of the network device or a billing network element.

6. The network device according to claim 1, wherein the network device comprises: a sharing network element, an entity of policy and charging rule function (PCRF), an authentication, authorization and accounting (AAA) server or a policy server.

7. The network device according to claim 6, wherein the sharing network element comprises: a network element of an access network, a network element of a core network or a network element of a subnet.

8. A method for sharing a network, comprising:

acquiring, by a network element, information about resource usage of sharing resources; and controlling, by the network element, the sharing resources of the network element according to the information about resource usage, wherein the information about resource usage comprises one or any combination of the following:

identities or index numbers of sharing types of used sharing resources, information about a user equipment using the types of sharing resources, and information about a home operator or a home public land mobile network (PLMN) of the user equipment, information about a user equipment which accesses the network element using all the types of sharing resources, and an identity of a service network or a core network or a PLMN which the user equipment accesses or a type of a service provided for the user equipment, shares or amounts for the used sharing resources or a proportion between an amount of the used sharing resources and an amount of the total resources, amounts of each of the types of sharing resources which are used by each of operators or PLMNs or a ratio thereof to the sharing resources, billing rates corresponding to the types of used sharing resources, a period of time or numbers of times for using each of the types of sharing resources, priorities of the types of used sharing resources, and amounts or proportions of portions of the used sharing resources which exceed share limits;

wherein the sharing types of the used sharing resources comprise: a dedicated resource, a mutual resource or a preemptive resource, wherein the dedicated resource is a sharing resource of the network element which is allocated to at least one operator or at least one PLMN and is exclusively used by the at least one operator or the at least one PLMN, or a resource which is monopolized by at least one operator or at least one PLMN but is allowed to be shared with other operators or other PLMNs, the mutual resource is a sharing resource of the network element which is allocated to the at least one operator or the at least one PLMN and is preferentially used by the at least one operator or the at least one PLMN, and is allowed to be rented to other operators or other PLMNs in a case that the at least one operator or the at least one PLMN does not use the sharing resource, and the preemptive resource is a resource which is usable for operators or PLMNs according to a chronological order for requesting the sharing resource and priorities for the operators and PLMNs.

9. The method according claim 8, wherein the controlling, by the network element, the sharing resources of the network element according to the information about resource usage comprises:
   determining, by the network element, usages of the shares of the resources in the network element for a current service operator or a current service PLMN of a user equipment transmitting a request for using resources according to the information about resource usage, and determining whether to allocate needed resources to the user equipment according to the usages of the shares of the resources.

10. The method according to claim 9, wherein the determining whether to allocate needed resources to the user equipment according to the usages of the shares of the resources comprises:
   allocating, by the network element, the sharing resources of the network element according to the priorities of the sharing resources, wherein a sharing resource with a high priority is allocated to the user equipment if the usage of the sharing resource with a high priority does not exceed a share limit, and
   allocating, by the network element, a sharing resource with a low priority to the user equipment or rejecting the request for using resources if the usage of the sharing resource with a high priority exceeds a share limit.

11. The method according claim 8, wherein the controlling, by the network element, the sharing resources of the network element according to the information about resource usage comprises:
   generating, by the network element, statistics on the types, shares or sharers of the sharing resources according to the information about resource usage, to acquire usages of the sharing types of the sharing resources by operators or PLMNs represented by different sharers, and performing billing processing according to billing rates corresponding to the types of sharing resources.

12. The method according claim 8, wherein the controlling, by the network element, the sharing resources of the network element according to the information about resource usage comprises:
   reporting, by the network element, the information about resource usage to an upstream network element or a billing network element.

13. A non-transitory machine-readable medium having stored thereon, a computer program comprising at least one code section for distributing data, the at least one code section being executable by a network element for causing the network element to perform the following:
   acquiring information about resource usage of sharing resources; and
   controlling the sharing resources of the network element according to the information about resource usage, wherein
   the information about resource usage comprises one or any combination of the following:
   identities or index numbers of sharing types of used sharing resources,
   information about a user equipment using the types of sharing resources, and information about a home operator or a home public land mobile network (PLMN) of the user equipment,
   information about a user equipment which accesses the network element using all the types of sharing resources, and an identity of a service network or a core network or a PLMN which the user equipment accesses or a type of a service provided for the user equipment,
   shares or amounts for the used sharing resources or a proportion between an amount of the used sharing resources and an amount of the total resources,
   amounts of each of the types of sharing resources which are used by each of operators or PLMNs or a ratio thereof to the sharing resources,
   billing rates corresponding to the types of used sharing resources,
   a period of time or numbers of times for using each of the types of sharing resources,
   priorities of the types of used sharing resources, and
   amounts or proportions of portions of the used sharing resources which exceed share limits;
   wherein the sharing types of the used sharing resources comprise: a dedicated resource, a mutual resource or a preemptive resource,
   wherein the dedicated resource is a sharing resource of the network element which is allocated to at least one operator or at least one PLMN and is exclusively used by the at least one operator or the at least one PLMN, or a resource which is monopolized by at least one operator or at least one PLMN but is allowed to be shared with other operators or other PLMNs,
   the mutual resource is a sharing resource of the network element which is allocated to the at least one operator or the at least one PLMN and is preferentially used by the at least one operator or the at least one PLMN, and is allowed to be rented to other operators or other PLMNs in a case that the at least one operator or the at least one PLMN does not use the sharing resource, and
   the preemptive resource is a resource which is usable for operators or PLMNs according to a chronological order for requesting the sharing resource and priorities for the operators and PLMNs.

14. The medium according claim 13, wherein the controlling the sharing resources of the network element according to the information about resource usage comprises:
   determining usages of the shares of the resources in the network element for a current service operator or a current service PLMN of a user equipment transmitting a request for using resources according to the information about resource usage, and determining whether to allocate needed resources to the user equipment according to the usages of the shares of the resources.

15. The medium according claim 14, wherein the determining whether to allocate needed resources to the user equipment according to the usages of the shares of the resources comprises:
   allocating the sharing resources of the network element according to the priorities of the sharing resources, wherein a sharing resource with a high priority is allocated to the user equipment if the usage of the sharing resource with a high priority does not exceed a share limit, and
   allocating a sharing resource with a low priority to the user equipment or rejecting the request for using resources if the usage of the sharing resource with a high priority exceeds a share limit.

16. The medium according claim 13, wherein the controlling the sharing resources of the network element according to the information about resource usage comprises:

generating statistics on the types, shares or sharers of the sharing resources according to the information about resource usage, to acquire usages of the sharing types of the sharing resources by operators or PLMNs represented by different sharers, and performing billing processing according to billing rates corresponding to the types of sharing resources.

17. The medium according claim 13, wherein the controlling the sharing resources of the network element according to the information about resource usage comprises:
reporting the information about resource usage to an upstream network element or a billing network element.

* * * * *